United States Patent
Brück et al.

(10) Patent No.: US 6,582,847 B1
(45) Date of Patent: Jun. 24, 2003

(54) METHOD FOR PRODUCING AN ELECTRODE, AND ELECTRODE FOR A FUEL CELL

(75) Inventors: Rolf Brück, Bergisch Gladbach (DE); Andrée Bergmann, Lohmar (DE); Jörg-Roman Konieczny, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 130 days.

(21) Appl. No.: 09/699,971

(22) Filed: Oct. 30, 2000

Related U.S. Application Data

(63) Continuation of application No. PCT/EP99/02919, filed on Apr. 29, 1999.

(30) Foreign Application Priority Data

Apr. 30, 1998 (DE) .......................... 198 19 331

(51) Int. Cl.⁷ .............................. H01M 4/88; H01M 4/96
(52) U.S. Cl. ............................ 429/42; 429/12; 429/13; 429/231.8; 29/623.1
(58) Field of Search .................. 429/42, 12, 231.8, 429/13; 29/623.1

(56) References Cited

U.S. PATENT DOCUMENTS

| | | |
|---|---|---|
| 3,790,410 A | 2/1974 | Mund et al. |
| 4,619,796 A | 10/1986 | Awata et al. |
| 4,832,870 A | 5/1989 | Clough et al. |

FOREIGN PATENT DOCUMENTS

| | | |
|---|---|---|
| DE | 197 09 199 A1 | 9/1998 |
| EP | 0 448 719 A1 | 10/1991 |
| WO | WO98/39809 | 9/1998 |

*Primary Examiner*—Patrick Ryan
*Assistant Examiner*—Angela J Martin
(74) *Attorney, Agent, or Firm*—Laurence A. Greenberg; Werner H. Stemer; Ralph E. Locher

(57) ABSTRACT

The invention relates to a method for producing an electrode and an electrode for a fuel cell, especially a low temperature fuel cell. According to the method, a blank containing organic polymers is subjected to a thermal treatment in order to convert the organic polymers at least partially into conductive polymers, especially with a graphite-type structure.

11 Claims, 1 Drawing Sheet

METHOD FOR PRODUCING AN ELECTRODE, AND ELECTRODE FOR A FUEL CELL

CROSS-REFERENCE TO RELATED APPLICATIONS

This is a continuation of copending International Application PCT/EP99/02919, filed Apr. 29, 1999, which designated the United States.

BACKGROUND OF THE INVENTION

FIELD OF THE INVENTION

The invention relates to a method for producing an electrode, and to an electrode for a fuel cell, in particular for a low-temperature fuel cell.

Fuel cells and fuel cell systems are gaining ever greater importance since they are of interest as an energy source for driving a motor vehicle, in particular for passenger motor vehicles. In addition to mobile use in motor vehicles, fuel cells are also used for stationary power supplies, in particular for local electrical power supplies.

Various types of fuel cells are known. These differ essentially by the electrolyte in the fuel cell and by the operating temperature at which the fuel cell operates.

So-called PEM (proton exchange membrane) fuel cells are used for low-temperature fuel cells, that is to say for fuel cells whose operating temperature is about 80° C. PEM fuel cells are fuel cells in which the electrolyte is formed by a proton-conducting membrane (proton exchange membrane).

The proton-conducting electrolyte membrane is a polymer film with a thickness of a few tenths of a millimeter. It is known that the proton-conducting electrolyte membrane can be coated with platinum and gas-permeable electrodes on both sides. This is referred to as a membrane electrode assembly (MEA). Graphite electrodes are used as the electrodes. The handling of such configurations is relatively problematic, since the proton-conducting electrolyte membrane is very thin, which can mean that, if the connection between the gas-permeable electrodes or platinum and the electrolyte membrane is not sufficiently robust, the platinum or the gas-permeable electrodes may become detached from the electrolyte membrane.

Electrodes are also known which are formed by graphite bodies. These graphite bodies are designed to be porous. They are brought into contact with the electrolyte.

SUMMARY OF THE INVENTION

It is accordingly an object of the invention to provide a method for producing an electrode for a fuel cell, which method can be carried out relatively easily, and to provide an electrode which can be produced easily.

With the foregoing and other objects in view, there is provided, according to the invention, a method for producing an electrode for a fuel cell, in particular for a low-temperature fuel cell, wherein a blank containing at least one organic polymer is subjected to heat treatment, such that the organic polymer or polymers s are at least partially converted into conductor polymers. This method results in the production of an electrode which comprises at least one electrically conductive layer which can be brought into contact with an electrolyte.

The blank entirely or at least in part contain organic polymers. In a blank which has the organic polymers only partially, these are preferably contained in an outer layer, so that only the outer layer of the electrode has electrically conductive characteristics after heat treatment, in particular after a pyrotechnic treatment. The mechanical characteristics of the electrode are governed by the other components in the electrode, which are preferably unchanged by the heat treatment, or are changed only to a minor extent.

In a further advantageous embodiment, the organic polymers are at least partially converted into graphite-like structures by the heat treatment. This refinement has the advantage that it results in an outer layer containing carbon.

In a further advantageous embodiment, the organic polymers are formed by polyacrylonitrile (PAN) or cellulose acetate, or a mixture of them.

Preferably, the polyacryolnitrile or cellulose acetate or a mixture of them is first stabilized during the heat treatment, such that the polyacrylnitrile, the cellulose acetate or the mixtures of them are converted to a form which cannot be melted. Carbonization with evolution of volatile products is then carried out at an increased temperature, that is to say at a temperature preferably between 1200 and 1500° C. The carbonization process is preferably carried out in a nitrogen atmosphere. This is followed by graphitization of the polyacrylnitrile or of the cellulose acetate, at a temperature between 2000 and 3000° C.

At least the graphitization process is preferably carried out in a vacuum. Alternatively, at least the graphitization process can be carried out in an inert gas atmosphere. The inert gas atmosphere preferably contains nitrogen or argon.

In a further advantageous embodiment, the blank subjected to heat treatment is at least partially porous. The porosity of the blank is maintained during the heat treatment. Even after formation of the conductor polymers, the electrode is porous. The porosity is sufficient to ensure that a fuel gas, in particular hydrogen or methanol, or an oxidant, in particular oxygen, reaches the electrolyte.

In order to provide the electrode produced in this way as a so-called common electrode as well, and in order to allow an external circuit to be formed, there is provided according to the invention a blank having at least two layers, wherein an outer layer of the blank has at least one organic polymer, which is at least partially converted into conductor polymer, and an electrically conductive layer adjacent to the outer layer. The electrically conductive layer ensures that current flows from the outer layer to a connection. The electrically conductive layer also reduces the resistive losses of the electrode, thus making it possible to increase the efficiency of the fuel cell.

Only the organic polymers are preferably converted during the heat treatment of the blank to form conductor polymers in an outer layer.

Also according to this invention, an electrode is provided for a fuel cell, in particular for a low-temperature fuel cell, which has an electrically conductive layer which is formed by thermal conversion of at least one organic polymer into conductor polymer. The electrode can be completely or in part electrically conductive.

At least the outer layer preferably has at least a partially graphite-like structure.

The electrically conductive polymers are preferably formed by heat treatment of polyacrylnitrile (PAN) or cellulose acetate, or a mixture of them.

In a further advantageous embodiment of the invention, the electrode is at least partially porous.

In yet another advantageous embodiment of the invention, the electrode has an outer layer containing conductor polymers and an electrically conductive layer adjacent to the outer layer.

Other features which are considered as characteristic for the invention are set forth in the appended claims.

Although the invention is illustrated and described herein as embodied in a method for producing an electrode, and an electrode for a fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
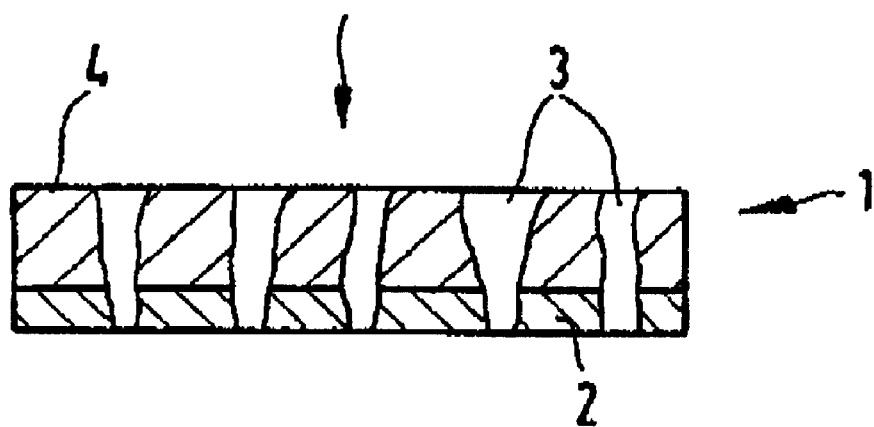
FIG. 1 shows a section through a first exemplary embodiment of an electrode.

Referring now to the figures of the drawing in detail and first, particularly, to FIG. 1 thereof, there is seen, by way of example and schematically, a first exemplary embodiment of an electrode 1 for a fuel cell, in particular for a low-temperature fuel cell. The low-temperature fuel cell is preferably a fuel cell with a proton-conducting electrolyte.

The electrode 1 comprises a porous electrode body 4. Pores 3 are formed in the porous electrode body 4. The electrode body 4 has an outer layer 2, which is formed by conductor polymers, in particular with a graphite-like structure. The outer layer 2 is also porous. The electrode 1 is sufficiently porous that it is gas-permeable for a fuel or an oxidant. The outer layer 2 can be brought into contact with an electrolyte, which is not shown. The arrow in FIG. 1 indicates the direction in which a fuel or an oxidant is supplied.

The electrode 1 shown in FIG. 1 is formed by heat treatment of a blank which contains organic polymers, wherein the organic polymers are at least partially converted into conductor polymers during the heat treatment.

Figure 2:
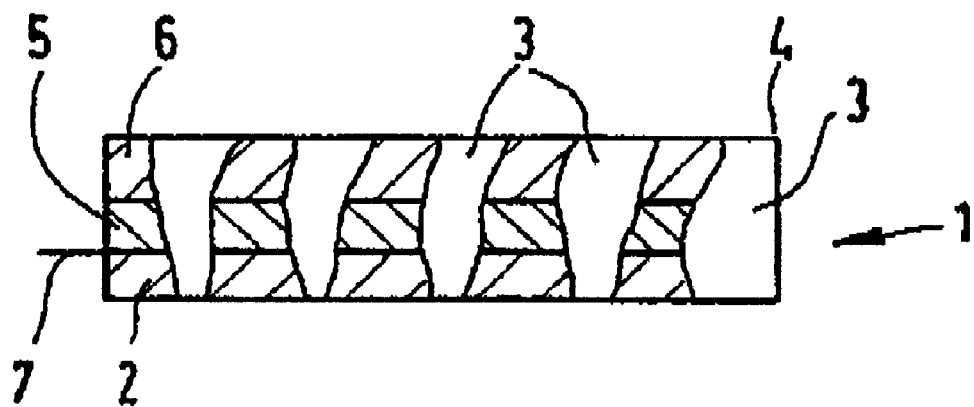
FIG. 2 shows a second exemplary embodiment of an electrode.

FIG. 2 shows a second exemplary embodiment of an electrode 1. The electrode 1 has an electrode body 4 which is porous. The reference number 3 denotes the pores of the porous electrode body 4.

The electrode 1, as it is shown in FIG. 2, has a multilayer construction. The electrode 1 has an outer layer 2 which is formed by conductor polymers. The conductor polymers preferably have a graphite-like structure. A layer 5 is joined to the outer layer 2, this layer 5 being an electrically conductive layer. The layer 5 is electrically connected to the outer layer 2. The layer 5 may also be formed by individual common conductors, which extend toward an electrical connection 7. An insulating layer 6 is formed on the layer 5.

The insulating layer 6 is intended to provide electrical insulation between the layer 5 or the outer layer 2 and the environment.

The configuration of the insulating layer 6 has the advantage that, when fuel cells are positioned such that the electrodes of adjacent fuel cells touch, in particular when the fuel cells are stacked, the electrodes of adjacent fuel cells can be electrically insulated from one another.

We claim:

1. A method of producing an electrode for a low temperature fuel cell, which comprises:

providing a blank formed with a plurality of layers including:
an outer layer comprising at least one organic polymer; and
an electrically conductive layer adjacent the outer layer, and heat-treating the blank to at least partially convert the at least one organic polymer into conductor polymer forming a low temperature fuel cell electrode.

2. The method according to claim 1, which comprises at least partially converting the organic polymer into graphite structures in the heat-treating step.

3. The method according to claim 1, which comprises selecting the organic polymer from the group consisting of polyacrylonitrile (PAN), cellulose acetate, and mixtures thereof.

4. The method according to claim 2, wherein the heat-treating step is performed in an inert gas atmosphere at least during graphitization.

5. The method according to claim 1, wherein the heat-treating step is performed in a vacuum at least during graphitization.

6. The method according to claim 1, wherein the blank subjected to heat treatment is at least partially porous.

7. The method according to claim 1, wherein the organic polymers are converted only in the outer layer comprising at least one organic polymer.

8. An electrode for a low temperature fuel cell, comprising an outer layer and an electrically conductive layer adjacent said outer layer, said outer layer and said conductive layer together forming a low temperature fuel cell electrode, said outer layer containing conductor polymer formed by thermal conversion of at least one organic polymer.

9. The electrode according to claim 8, wherein at least the outer layer has at least partially graphite structures.

10. The electrode according to claim 8, wherein said conductor polymer is formed by heat treatment of at least one organic polymer selected from the group consisting of polyacrylnitrile (PAN), cellulose acetate, and mixtures thereof.

11. The electrode according to claim 8, wherein at least one of said outer layer and said electrically conductive layer is at least partially porous.

\* \* \* \* \*